United States Patent
Yang

(10) Patent No.: US 10,892,916 B2
(45) Date of Patent: Jan. 12, 2021

(54) CHANNEL ESTIMATION METHOD AND CIRCUIT

(71) Applicant: ALi Corporation, Hsinchu (TW)

(72) Inventor: Yong Yang, Hsinchu (TW)

(73) Assignee: ALi Corporation, Hsinchu (TW)

( * ) Notice: Subject to any disclaimer, the term of this patent is extended or adjusted under 35 U.S.C. 154(b) by 0 days.

(21) Appl. No.: 16/538,851

(22) Filed: Aug. 13, 2019

(65) Prior Publication Data

US 2020/0067736 A1    Feb. 27, 2020

(30) Foreign Application Priority Data

Aug. 27, 2018 (CN) .......................... 2018 1 0980627

(51) Int. Cl.
*H04L 25/02* (2006.01)
*H04B 7/0413* (2017.01)
*H04W 84/12* (2009.01)

(52) U.S. Cl.
CPC ....... *H04L 25/0204* (2013.01); *H04B 7/0413* (2013.01); *H04L 25/023* (2013.01); *H04W 84/12* (2013.01)

(58) Field of Classification Search
CPC ............. H04L 25/0202; H04L 25/0204; H04L 25/0208; H04L 25/0224; H04L 25/0226; H04L 25/0228; H04L 25/023; H04L 25/0236; H04B 7/0413; H04W 84/12

See application file for complete search history.

(56) References Cited

U.S. PATENT DOCUMENTS

| | | | | |
|---|---|---|---|---|
| 8,467,481 B1* | 6/2013 | Nabar | ................. | H04L 25/0236 375/316 |
| 2014/0314063 A1* | 10/2014 | Yu | ....................... | H04L 25/0228 370/338 |
| 2016/0149727 A1* | 5/2016 | Hu | ....................... | H04L 25/0226 370/252 |

* cited by examiner

*Primary Examiner* — Betsy Deppe

(57) ABSTRACT

A channel estimation method and circuit. The channel estimation method, adapted for a receiving device of a multi-input multi-output wireless LAN system, comprises the following steps. Firstly, performing a first channel estimation operation on a long training field to obtain a plurality of first composite channel estimation values related to the long training field. Then, performing a second channel estimation operation on a signal field to obtain a plurality of second composite channel estimation values related to the signal field, and performing a third channel estimation operation on a data segment to obtain a plurality of first channel estimation values related to the data segment. Next, obtaining a plurality of second channel estimation values according to the first composite channel estimation values and the second composite channel estimation values, and adjusting the first channel estimation values related to the data segment according to the second channel estimation values.

18 Claims, 4 Drawing Sheets

CHANNEL ESTIMATION METHOD AND CIRCUIT

FIELD OF THE INVENTION

The present invention relates to a channel estimation method and circuit, and more particularly to a channel estimation method and circuit adapted for a multi-input multi-output wireless LAN (MIMO WLAN) system.

BACKGROUND OF THE INVENTION

In the field of wireless communication, channel estimation is one of the most critical technologies that can directly affect system reliability. If orthogonal frequency division multiplexing (OFDM) technology is used as an example, its channel estimation method usually inserts known scattered pilots in a frame transmitted by a transmitting end, and firstly obtains channel estimation values of the pilots at a receiving end, and then performs time domain filtering on the channel estimation values of the pilots, and finally performs frequency domain filtering on the time domain filtered results to obtain the channel estimation values of the entire transmission channel.

However, for MIMO WLAN systems of OFDM technology, such as IEEE 802.11n or 802.11ac, since its conventional channel estimation is only complete in the high throughput long training field (HT-LTF) or the very high throughput long training field (VHT-LTF) phase in the frame, once the channel estimation value is determined in the HT-LTF or VHT-LTF phase, this channel estimation value will be used by the remainder of the frame. Therefore, how the receiving end obtains the channel estimation value of the remainder, and especially tracking the fading changes of the entire MIMO channel, is a problem that needs to be solved urgently in the field.

SUMMARY OF THE INVENTION

In view of the above problem, the present invention provides a channel estimation method, adapted for a receiving device of a MIMO WLAN system. The receiving device has N receiving antennas, through the N receiving antennas the receiving device receives a frame transmitted from M transmitting antennas, and the frame comprises at least one long training field, a signal field (SIG) and a data segment, wherein M and N are both positive integers greater than 1, and the channel estimation method comprises the following steps. Firstly, performing a first channel estimation operation on the long training field to obtain a plurality of first composite channel estimation values related to the long training field. Then, performing a second channel estimation operation on the signal field to obtain a plurality of second composite channel estimation values related to the signal field, and performing a third channel estimation operation on the data segment to obtain a plurality of first channel estimation values related to the data segment. Next, obtaining a plurality of second channel estimation values according to the first composite channel estimation values and the second composite channel estimation values, and adjusting the first channel estimation values related to the data segment according to the second channel estimation values.

The present invention further provides a channel estimation circuit, adapted for a receiving device of a MIMO WLAN system. The receiving device has N receiving antennas, through the N receiving antennas the receiving device receives a frame transmitted from M transmitting antennas, and the frame comprises at least one long training field, a signal field and a data segment, wherein M and N are both positive integers greater than 1, and the channel estimation circuit comprises a long training field channel estimation circuit, a signal field channel estimation circuit, a data segment channel estimation circuit, and a time domain filtering circuit. The long training field channel estimation circuit performs a first channel estimation operation on the long training field to obtain a plurality of first composite channel estimation values related to the long training field. The signal field channel estimation circuit performs a second channel estimation operation on the signal field to obtain a plurality of second composite channel estimation values related to the signal field. The data segment channel estimation circuit performs a third channel estimation operation on the data segment to obtain a plurality of first channel estimation values related to the data segment. The time domain filtering circuit, coupled to the long training field channel estimation circuit, the signal field channel estimation circuit and the data segment channel estimation circuit, is used to obtain a plurality of second channel estimation values according to the first composite channel estimation values and the second composite channel estimation values, and to adjust the first channel estimation values related to the data segment according to the second channel estimation values.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF PREFERRED EMBODIMENTS

Figure 1:
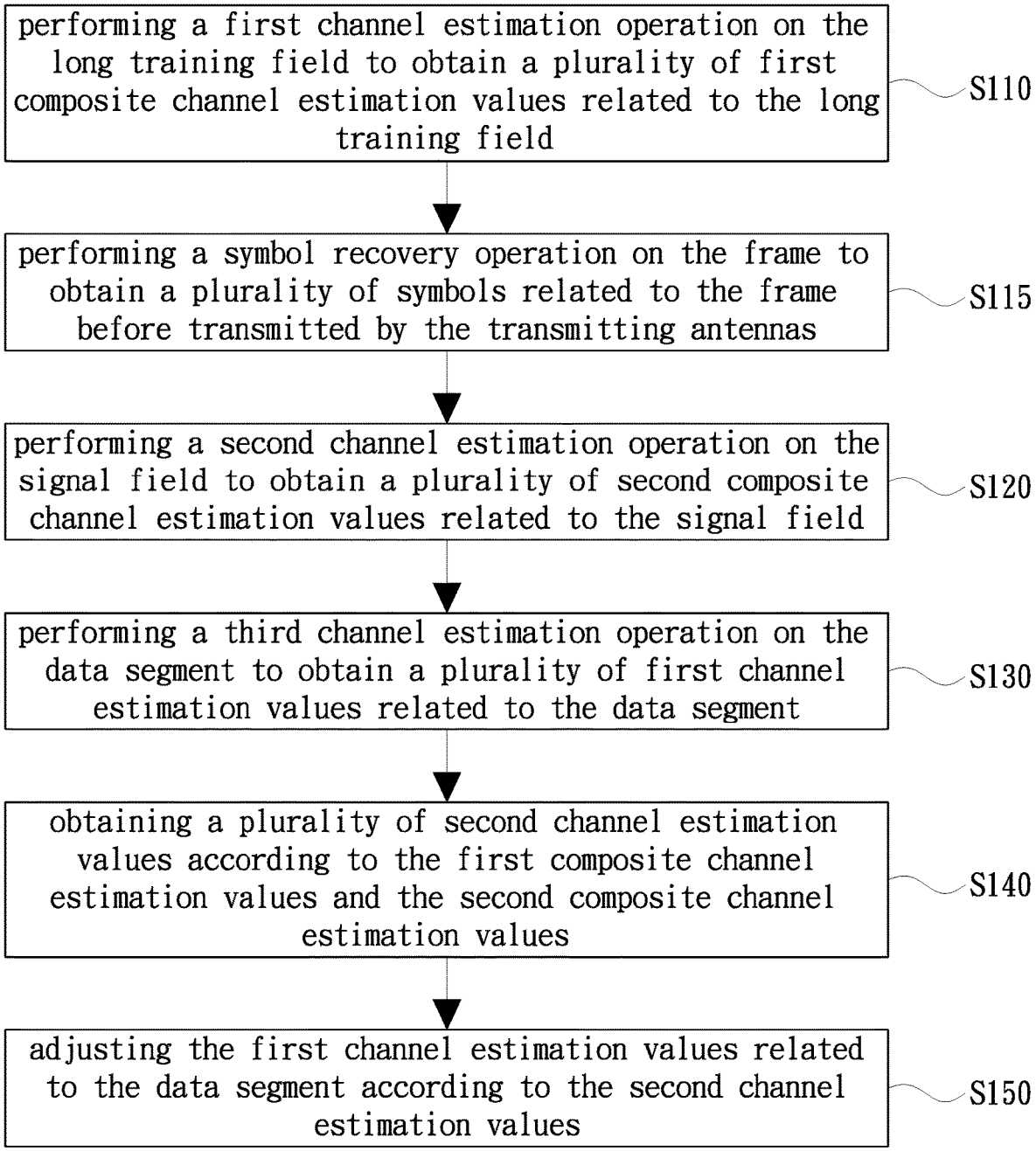
FIG. 1 is a flowchart of a channel estimation method in one embodiment of the present invention.

In the following, the present invention will be described in detail by various embodiments of the present invention in conjunction with the accompanying drawings. However, the concepts of the present invention may be embodied in many different forms and should not be construed as being limited to the illustrative embodiments set forth herein. In addition, the same reference numerals in the drawings can be used to represent similar elements.

Specifically, the channel estimation method and circuit provided by the present invention can be applicable to a receiving device in any MIMO WLAN system. For example, the MIMO WLAN system can be implemented by a standard such as IEEE 802.11n or 802.11ac, but the present invention is not limited thereto. In addition, the receiving device can be, for example, a WLAN router, a computer, a set-top box, or a smart TV. However, the present invention does not limit the specific implementation manner of the receiving device, and those ordinarily skilled in the art should be able to make related designs based on actual requirements or applications. In summary, the receiving device of the MIMO WLAN system has N receiving antennas, and through the N receiving antennas the receiving device receives a frame transmitted from M transmitting antennas.

It should be understood that both M and N are positive integers greater than 1, and according to the prior art it can be known that, the channel estimation method of this embodiment starts execution after frame synchronization has been performed. Therefore, the frame received by the receiving device in this embodiment can be a frame after the synchronization has been completed, but the present invention does not limit the specific implementation manner when the receiving device performs frame synchronization, and those skilled in the art can make related designs based on actual requirements or applications. In addition, according to the IEEE 802.11n or 802.11ac standard, it can be known that the frame comprises at least one long training field, a signal field, and a data segment. Since the technical principles of the MIMO WLAN system and the frame structure of the IEEE 802.11n or 802.11ac are well known to those of ordinary skill in the art, the details of the above-mentioned content will not be further described herein.

Please refer to FIG. 1. FIG. 1 is a flowchart of a channel estimation method in one embodiment of the present invention. Firstly, in step S110, performing a first channel estimation operation on the long training field to obtain a plurality of first composite channel estimation values related to the long training field. Then, in step S120, performing a second channel estimation operation on the signal field to obtain a plurality of second composite channel estimation values related to the signal field, and in step S130, performing a third channel estimation operation on the data segment to obtain a plurality of first channel estimation values related to the data segment. Next, in step S140, obtaining a plurality of second channel estimation values according to the first composite channel estimation values and the second composite channel estimation values, and in step S150, adjusting the first channel estimation values related to the data segment according to the second channel estimation values.

It should be understood that, in this embodiment, if IEEE 802.11n is used as an example, the long training field is the HT-LTF, and the signal field comparatively is a high-throughput signal field (HT-SIG); if IEEE 802.11ac is used as an example, the long training field is the VHT-LTF, and the signal field comparatively is a very high throughput signal field type B (VHT-SIG-B), but the present invention is not limited thereto. For convenience of the following description, this embodiment is described only by an example in which both M and N are 2 and a single user (SU), but it is not intended to limit the present invention.

Figure 2:
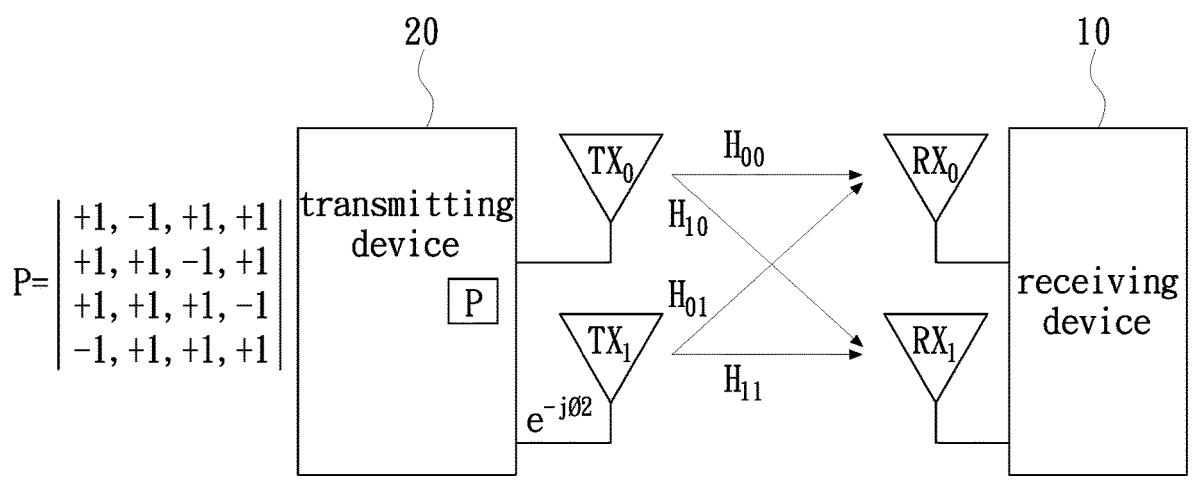
FIG. 2 is a schematic diagram of a MIMO channel in one embodiment of the present invention.

For example, please refer to FIG. 2. FIG. 2 is a schematic diagram of a MIMO channel in one embodiment of the present invention. As shown in FIG. 2, a receiving device 10 of the present invention has two receiving antennas $RX_0$, $RX_1$, and through the two receiving antennas $RX_0$, $RX_1$ the receiving device 10 receives a frame transmitted from two transmitting antennas $TX_0$, $TX_1$ of a transmitting device 20. An entire MIMO channel formed by the two transmitting antennas $TX_0$ and $TX_1$ and the two receiving antennas $RX_0$ and $RX_1$ is represented by channel estimation values $H_{00}$, $H_{01}$, $H_{10}$ and $H_{11}$. In addition, according to the IEEE 802.11n or 802.11ac standard, it can be known that the HT-LTF or VHT-LTF of the transmitting end is multiplied by a known mapping matrix P, and a signal transmitted by the transmitting antenna $TX_1$ is multiplied by $e^{-j\Theta 2}$. Since the technical principles of IEEE 802.11n or 802.11ac are also well known to those of ordinary skill in the art, the details of the above-mentioned content will not be further described herein.

In detail, since the HT-LTF or VHT-LTF is also a sequence known by the receiving end, in the first channel estimation operation of step S110, the receiving device 10 can obtain the first composite channel estimation values related to the long training field based on the known long training field and the mapping matrix P. In order to facilitate the following description, this embodiment is described only by an example in which the long training field is the VHT-LTF and the signal field is the VHT-SIG-B, that is, IEEE 802.11ac, but it is not intended to limit the present invention. Therefore, the first composite channel estimation values obtained in step S110 can be simplified as shown in the following equations (1) to (4).

$$H_{R00,ltf} = (+1)H_{00} + (+1)H_{01}e^{-j\Theta 2} \qquad \text{equation(1)}$$

$$H_{R01,ltf} = (-1)H_{00} + (+1)H_{01}e^{-j\Theta 2} \qquad \text{equation(2)}$$

$$H_{R10,ltf} = (+1)H_{10} + (+1)H_{11}e^{-j\Theta 2} \qquad \text{equation(3)}$$

$$H_{R11,ltf} = (-1)H_{10} + (+1)H_{11}e^{-j\Theta 2} \qquad \text{equation(4)}$$

Wherein $H_{R00,ltf}$ is the first composite channel estimation value when the first receiving antenna $RX_0$ receives a first signal related to the VHT-LTF, and $H_{R01,ltf}$ is the first composite channel estimation value when the first receiving antenna $RX_0$ receives a second signal related to the VHT-LTF, by analogy, and $H_{R11,ltf}$ is the first composite channel estimation value when the second receiving antenna $RX_1$ receives a second signal related to the VHT-LTF.

In general, the receiving device 10 can obtain the channel estimation values $H_{00}$, $H_{01}$, $H_{10}$, and $H_{11}$ related to the long training field according to the first composite channel estimation values $H_{R00,ltf}$, $H_{R01,ltf}$, $H_{R10,ltf}$ and $H_{R11,ltf}$ as shown in the following equations (5) to (8).

$$H_{00} = (H_{R00,ltf} - H_{R01,ltf})/2 \qquad \text{equation(5)}$$

$$H_{01}e^{-j\Theta 2} = (H_{R00,ltf} + H_{R01,ltf})/2 \qquad \text{equation(6)}$$

$$H_{10} = (H_{R10,ltf} - H_{R11,ltf})/2 \qquad \text{equation(7)}$$

$$H_{11}e^{-j\Theta 2} = (H_{R10,ltf} + H_{R11,ltf})/2 \qquad \text{equation(8)}$$

As described in the foregoing, since the conventional channel estimation only determines the channel estimation values $H_{00}$, $H_{01}$, $H_{10}$ and $H_{11}$ in the VHT-LTF phase, that is, in the equations (5) to (8), and the channel estimation values $H_{00}$, $H_{01}$, $H_{10}$ and $H_{11}$ are used as the channel estimation values for the remainder of the frame, i.e., used by the remainder of the frame; compared with the prior art, this embodiment gives more consideration to estimating the channel estimation values related to the VHT-SIG-B and the data segment. However, in order to perform channel estimation on the VHT-SIG-B and the data segment, in the channel estimation method of FIG. 1, step S115 can be further included. In step S115, this embodiment performs a symbol recovery operation on the frame to obtain a plurality of symbols related to the frame before transmitted by the transmitting antennas $TX_0$ and $TX_1$, and in the second channel estimation operation in step S120, the receiving device 10 can obtain the second composite channel estimation values related to the signal field according to the recovered symbols.

Since the technical principles of restoring the frame into the symbols before transmission are well known to those of ordinary skill in the art, the details of the above-mentioned content will not be further described herein. In summary, the present invention also does not limit the specific implementation manner of the symbol recovery operation, and those ordinarily skilled in the art should be able to make related designs according to actual needs or applications. In addition, since the VHT-SIG-B only contains a single symbol, the second composite channel estimation values obtained in step S120 can be simplified as shown in the following equations (9) to (10).

$$H_{R00,sigb} = H_{00} + H_{01}e^{-j\Theta 2} \qquad \text{equation(9)}$$

$$H_{R10,sigb} = H_{10} + H_{11}e^{-j\Theta 2} \qquad \text{equation(10)}$$

Wherein $H_{R00,sigb}$ is the second composite channel estimation value when the first receiving antenna $RX_0$ receives a signal related to the VHT-SIG-B, and $H_{R10,sigb}$ is the second composite channel estimation value when the second receiving antenna $RX_1$ receives a signal related to the VHT-SIG-B. Similarly, in the third channel estimation operation of step S130, the receiving device 10 can also obtain the first channel estimation values related to the data segment based on the recovered symbols. It should be understood that in this embodiment, the recovered symbols can be distinguished according to different transmitting antenna and different transmitting moment. In order to facilitate the following description, this embodiment is described only by an example of two spatial streams adopted in the MIMO WLAN system, but it is not intended to limit the present invention. Therefore, data signals received in the first receiving antenna $RX_0$ can be simplified as shown in the following equations (11) to (13).

$$Y_{0,1} = S_{0,1}*H_{00} + S_{1,1}*H_{01} \qquad \text{equation(11)}$$

$$Y_{0,2} = S_{0,2}*H_{00} + S_{1,2}*H_{01} \qquad \text{equation(12)}$$

$$Y_{0,L} = S_{0,L}*H_{00} + S_{1,L}*H_{01} \qquad \text{equation(13)}$$

Wherein the data signal $Y_{0,1}$ is a composite of the symbols $S_{0,1}$, $S_{1,1}$ received by the first receiving antenna $RX_0$ at a first transmitting moment and transmitted by the transmitting antennas $TX_0$ and $TX_1$, and the data signal $Y_{0,2}$ is a composite of the symbols $S_{0,2}$, $S_{1,2}$ received by the first receiving antenna $RX_0$ at a second transmitting moment and transmitted by the transmitting antennas $TX_0$ and $TX_1$, by analogy, and the data signal $Y_{0,L}$ is a composite of the symbols $S_{0,L}$, $S_{1,L}$ received by the first receiving antenna $RX_0$ at a L transmitting moment and transmitted by the transmitting antennas $TX_0$ and $TX_1$, wherein L is a positive integer greater than 1. That is to say, in this embodiment, the symbols $S_{0,1}$ to $S_{1,L}$ can be recovered by using the channel estimation values $H_{00}$, $H_{01}$, $H_{10}$ and $H_{11}$ as in the conventional equations (5) to (8), and based on the recovered symbols $S_{0,1}$ to $S_{1,L}$ and the received data signals $Y_{0,1}$ to $Y_{0,L}$, the channel estimation values $H_{00}$, $H_{01}$, $H_{10}$ and $H_{11}$ related to the data segment are estimated.

In addition, it should be understood that if a determinant calculation result of the recovered symbols $S_{0,1}$, $S_{1,1}$, $S_{0,2}$ and $S_{1,2}$ is zero, this embodiment should utilize the recovered symbols $S_{0,1}$, $S_{1,1}$, $S_{0,3}$ and $S_{1,3}$ to continue to form a new matrix, until a determinant calculation result of the composed matrix is not zero, this embodiment begins to estimate the channel estimation values $H_{00}$, $H_{01}$, $H_{10}$ and $H_{11}$ of the data segment. That is to say, in step S130, it can further comprise determining whether to perform the third channel estimation operation on the data segment according to the determinant calculation result of the symbols. Therefore, in this embodiment, the third channel estimation operation on the data segment is performed when the determinant calculation results of the symbols $S_{0,1}$, $S_{1,1}$ at the first transmitting moment and the symbols $S_{0,L}$, $S_{1,L}$ at the L transmitting moment are not zero. Since the principles of determinant calculation of matrix are well known to those of ordinary skill in the art, the details of the above-mentioned content will not be further described herein.

Figure 3:
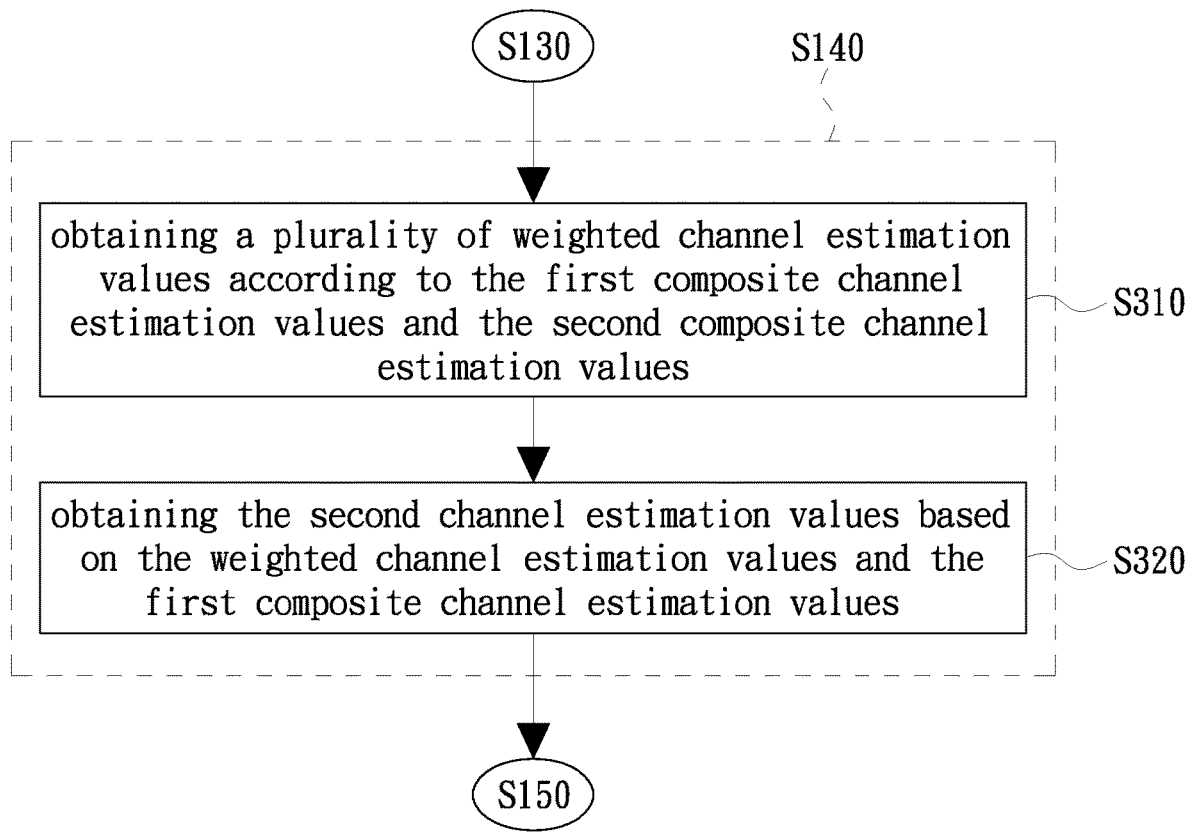
FIG. 3 is a flowchart of obtaining the second channel estimation values in the channel estimation method of FIG. 1.

Next, please refer to FIG. 3. FIG. 3 is a flowchart of obtaining the second channel estimation values in the channel estimation method of FIG. 1. As shown in FIG. 3, step S140 can further include steps S310 and S320. In step S310, a plurality of weighted channel estimation values is obtained according to the first composite channel estimation values $H_{R00,ltf}$, $H_{R01,ltf}$, $H_{R10,ltf}$, $H_{R11,ltf}$ and the second composite channel estimation values $H_{R00,sigb}$, $H_{R10,sigb}$. Then, in step S320, the second channel estimation values are obtained based on the weighted channel estimation values and the first composite channel estimation values $H_{R00,ltf}$, $H_{R01,ltf}$, $H_{R10,ltf}$, $H_{R11,ltf}$. In detail, the weighted channel estimation values obtained in step S310 can be simplified as shown in the following equations (14) and (15). In addition, according to the teachings of equations (14)/(15) and equations (2)/(4), those ordinarily skilled in the art should be able to understand that a plurality of new channel estimation values obtained $H_{00}$, $H_{01}$, $H_{10}$ and $H_{11}$ in step S320 can be shown as the following equations (16) to (19).

$$H_{R00} = (H_{R00,sigb} + H_{R00,ltf})/2 \qquad \text{equation(14)}$$

$$H_{R10} = (H_{R10,sigb} + H_{R10,ltf})/2 \qquad \text{equation(15)}$$

$$H_{00} = (H_{R00} - H_{R1,ltf})/2 \qquad \text{equation(16)}$$

$$H_{01}e^{-j\Theta 2} = (H_{R00} + H_{R01,ltf})/2 \qquad \text{equation(17)}$$

$$H_{10} = (H_{R10} - H_{R11,ltf})/2 \qquad \text{equation(18)}$$

$$H_{11}e^{-j\Theta 2} = (H_{R10} + H_{R11,ltf})/2 \qquad \text{equation(19)}$$

Since the weighted channel estimation value $H_{R00}$ is generated by dividing the sum of the first composite channel estimation value $H_{R00,ltf}$ and the second composite channel estimation value $H_{R00,sigb}$ by 2, and the weighted channel estimation value $H_{R10}$ is generated by dividing the sum of the first composite channel estimation value $H_{R10,ltf}$ and the second composite channel estimation value $H_{R10,sigb}$ by 2, this embodiment can effectively reduce the interference effect of noise on the entire MIMO channel, and make use of the weighted channel estimation values $H_{R00}$, $H_{R10}$ and the first composite channel estimation values $H_{R01,ltf}$, $H_{R11,ltf}$ to estimate the new channel estimation values $H_{00}$, $H_{01}$, $H_{10}$ and $H_{11}$ as shown in the equations (16) through (19). Then, in step S150, the channel estimation values $H_{00}$, $H_{01}$, $H_{10}$ and $H_{11}$ related to the data segment are adjusted according to the new channel estimation values $H_{00}$, $H_{01}$, $H_{10}$ and $H_{11}$.

That is to say, since the above new channel estimation values $H_{00}$, $H_{01}$, $H_{10}$ and $H_{11}$ are only used for adjusting the channel estimation values $H_{00}$, $H_{01}$, $H_{10}$ and $H_{11}$ related to the data segment, they are called the second channel estimation values. According to the teachings of the above, it should be understood by those of ordinary skill in the art that one of the main spirits of this embodiment is that an initial value of the entire MIMO channel is estimated based on the VHT-LTF, and then the VHT-SIG-B is utilized to enhance the precision of the estimated channel estimation values $H_{00}$, $H_{01}$, $H_{10}$ and $H_{11}$, that is, to enhance the estimation efficiency of the entire MIMO channel. It should be explained that the present invention also does not limit the specific implementation manner in which the channel estimation values $H_{00}$, $H_{01}$, $H_{10}$ and $H_{11}$ in the equations (16) to (19)

being used to adjust the channel estimation values $H_{00}$, $H_{01}$, $H_{10}$ and $H_{11}$ related to the data segment in step S150, those ordinarily skilled in the art should be able to make related designs according to actual needs or applications. In summary, it can be known from the above that, this embodiment is more capable of tracking the fading changes of the entire MIMO channel by obtaining the channel estimation values $H_{00}$, $H_{01}$, $H_{10}$ and $H_{11}$ of the data segment.

Figure 4:
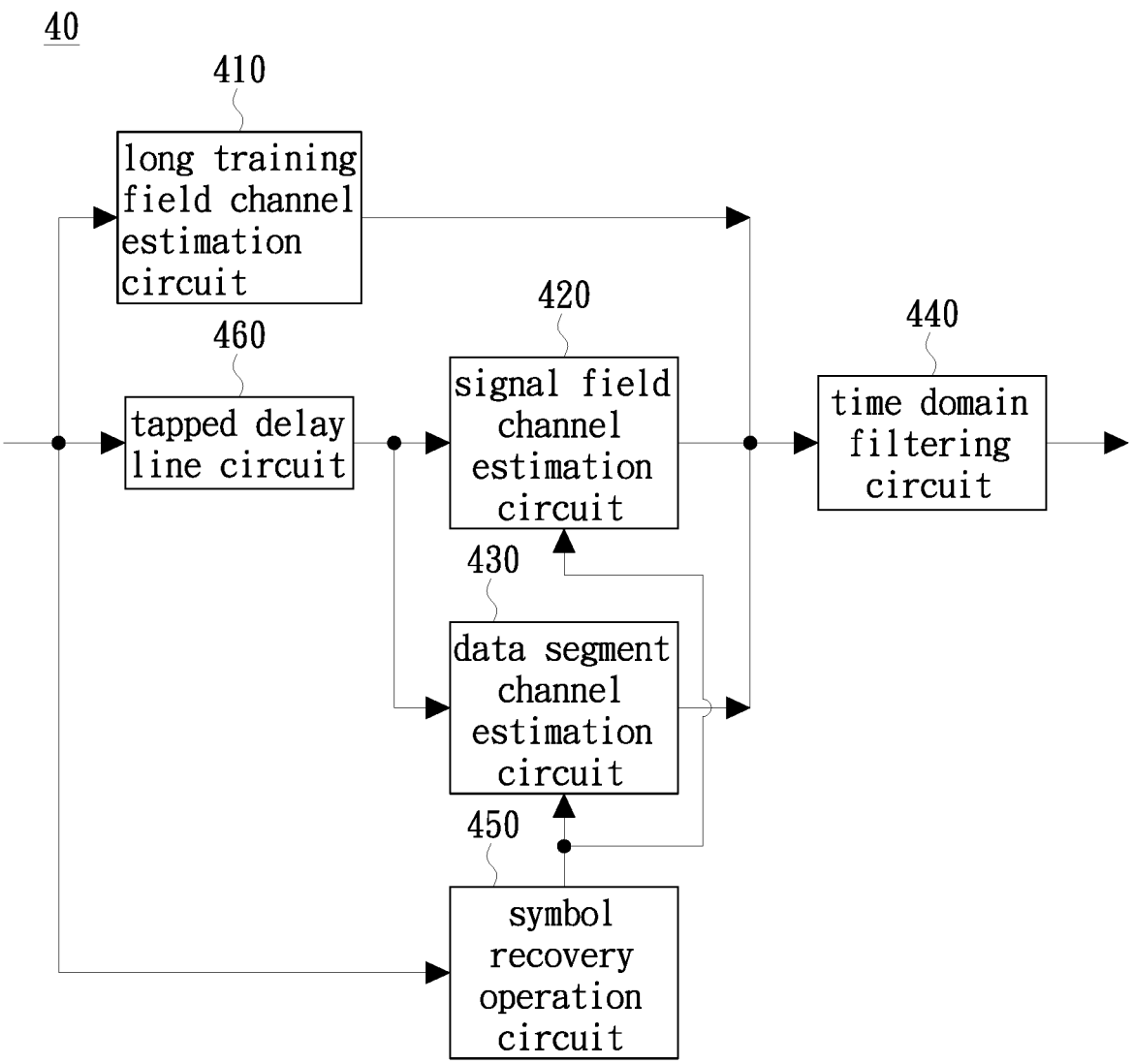
FIG. 4 is a functional block diagram of a channel estimation circuit in one embodiment of the present invention.

Finally, in order to further illustrate the operational flow of the channel estimation method described above, the present invention further provides an embodiment of the method. Please refer to FIG. 4 along with the other drawings, FIG. 4 is a functional block diagram of a channel estimation circuit in one embodiment of the present invention. As shown in FIG. 4, a channel estimation circuit 40 can include a long training field channel estimation circuit 410, a signal field channel estimation circuit 420, a data segment channel estimation circuit 430, and a time domain filtering circuit 440. It should be explained that the long training field channel estimation circuit 410, the signal field channel estimation circuit 420, the data segment channel estimation circuit 430, and the time domain filtering circuit 440 can be implemented by a pure hardware circuit or by a hardware circuit in conjunction with firmware or software. In summary, the present invention does not limit the specific implementation manner of the channel estimation circuit 40. In addition, the long training field channel estimation circuit 410, the signal field channel estimation circuit 420, the data segment channel estimation circuit 430, and the time domain filtering circuit 440 can be integratedly or separately disposed, and the present invention is not limited thereto.

In detail, the long training field channel estimation circuit 410 performs the first channel estimation operation on the long training field, such as the VHT-LTF of IEEE 802.11ac, to obtain the first composite channel estimation values related to the VHT-LTF, such as the $H_{R00,ltf}$, $H_{R01,ltf}$, $H_{R10,ltf}$ and $H_{R11,ltf}$ in equations (1) to (4). The signal field channel estimation circuit 420 performs the second channel estimation operation on the signal field, such as the VHT-SIG-B of IEEE 802.11ac, to obtain the second composite channel estimation values related to the VHT-SIG-B, such as the $H_{R00,sigb}$ and $H_{R10,sigb}$ in equations (9) to (10). In addition, the data segment channel estimation circuit 430 performs the third channel estimation operation on the data segment to obtain the first channel estimation values such as the $H_{00}$, $H_{01}$, $H_{10}$ and $H_{11}$ related to the data segment. The time domain filtering circuit 440, coupled to the long training field channel estimation circuit 410, the signal field channel estimation circuit 420, and the data segment channel estimation circuit 430, and is used to obtain the second channel estimation values such as the $H_{00}$, $H_{01}$, $H_{10}$ and $H_{11}$ in equations (16) to (19) according to the first composite channel estimation values $H_{R00,ltf}$, $H_{R01,ltf}$, $H_{R10,ltf}$, $H_{R11,ltf}$ and the second composite channel estimation values $H_{R00,sigb}$, $H_{R10,sigb}$, and to adjust the first channel estimation values $H_{00}$, $H_{01}$, $H_{10}$ and $H_{11}$ related to the data segment according to the second channel estimation values $H_{00}$, $H_{01}$, $H_{10}$ and $H_{11}$. Since the details are the same as the content described above, they will not be repeated here.

On the other hand, in this embodiment, the channel estimation circuit 40 can further include a symbol recovery operation circuit 450 for performing a symbol recovery operation on the frame to obtain a plurality of symbols related to the frame before transmitted by the transmitting antennas $TX_0$ and $TX_1$, but the present invention also does not limit the specific implementation manner of the symbol recovery operation circuit 450, and those ordinarily skilled in the art should be able to make related designs according to actual needs or applications. It should be understood that, in the second channel estimation operation, the signal field channel estimation circuit 420 can obtain the second composite channel estimation values $H_{R00,sigb}$ and $H_{R10,sigb}$ related to the signal field according to the recovered symbols. And in the third channel estimation operation, the data segment channel estimation circuit 430 can also obtain the first channel estimation values $H_{00}$, $H_{01}$, $H_{10}$ and $H_{11}$ related to the data segment according to the recovered symbols, such as the $S_{0,1}$ to $S_{1,L}$ in the equations (11) to (13).

Therefore, it should be understood that this embodiment can be further disposed with a tapped delay line (TDL) circuit 460 commonly at front ends of the signal field channel estimation circuit 420 and the data segment channel estimation circuit 430 to delay the time of the second channel estimation operation and the third channel estimation operation performed by the signal field channel estimation circuit 420 and the data segment channel estimation circuit 430. Similarly, it should be understood that this embodiment can be further disposed with a frequency domain filtering circuit (not shown) at a back end of the time domain filtering circuit 440 for performing frequency domain filtering on the output results of the time domain filtering circuit 440, thereby obtaining more complete channel estimation results.

In addition, as described in the foregoing, the time domain filtering circuit 440 can first obtain the weighted channel estimation values, such as the $H_{R00}$ and $H_{R10}$ in equations (14) through (15) according to the first composite channel estimation values $H_{R00,ltf}$, $H_{R01,ltf}$, $H_{R10,ltf}$, $H_{R11,ltf}$ and the second composite channel estimation values $H_{R00,sigb}$, $H_{R10,sigb}$; and obtain the second channel estimation values such as the $H_{00}$, $H_{01}$, $H_{10}$ and $H_{11}$ in equations (16) through (19) according to the weighted channel estimation values $H_{R00}$, $H_{R10}$ and the first composite channel estimation values $H_{R00,ltf}$, $H_{R01,ltf}$, $H_{R10,ltf}$, $H_{R11,ltf}$; and then adjust the first channel estimation values $H_{00}$, $H_{01}$, $H_{10}$ and $H_{11}$ related to the data segment according to the second channel estimation values $H_{00}$, $H_{01}$, $H_{10}$ and $H_{11}$. Since the details are the same as the content described above, they will not be repeated here.

In summary, the channel estimation method and circuit provided by the present invention can be applicable to any MIMO WLAN system, and in particular, IEEE 802.11n or 802.11ac using OFDM technology. Furthermore, the channel estimation method and circuit can first estimate the initial value of the entire MIMO channel according to the HT-LTF or VHT-LTF, and then use the HT-SIG or VHT-SIG-B to enhance the precision of the estimated channel estimation values, that is, to enhance the estimation efficiency of the entire MIMO channel. In addition, since the channel estimation method and circuit can directly use the recovered symbols to estimate the channel estimation values of the data segment, it is more capable of tracking the fading changes of the entire MIMO channel by obtaining the channel estimation values of the data segment.

Note that the specification relating to the above embodiments should be construed as exemplary rather than as limitative of the present invention, with many variations and modifications being readily attainable by a person of average skill in the art without departing from the spirit or scope thereof as defined by the appended claims and their legal equivalents.

What is claimed is:

1. A channel estimation method, adapted for a receiving device of a multi-input multi-output wireless LAN system, wherein the receiving device has N receiving antennas, through the N receiving antennas the receiving device receives a frame transmitted from M transmitting antennas, and the frame comprises at least one long training field, a signal field and a data segment, wherein M and N are both positive integers greater than 1, and the channel estimation method comprises following steps of:

performing a first channel estimation operation on the long training field to obtain a plurality of first composite channel estimation values related to the long training field;

performing a second channel estimation operation on the signal field to obtain a plurality of second composite channel estimation values related to the signal field;

performing a third channel estimation operation on the data segment to obtain a plurality of first channel estimation values related to the data segment;

obtaining a plurality of second channel estimation values according to the plurality of first composite channel estimation values and the plurality of second composite channel estimation values; and adjusting the plurality of first channel estimation values related to the data segment according to the plurality of second channel estimation values.

2. The channel estimation method according to claim 1, wherein the long training field and the signal field are respectively a high throughput long training field and a high throughput signal field, or respectively a very high throughput long training field and a very high throughput signal field type B.

3. The channel estimation method according to claim 2, wherein the step of performing the first channel estimation operation on the long training field to obtain the plurality of first composite channel estimation values related to the long training field further comprises obtaining the plurality of first composite channel estimation values related to the long training field based on the known long training field and a mapping matrix.

4. The channel estimation method according to claim 3, wherein the channel estimation method further comprises a step of performing a symbol recovery operation on the frame to obtain a plurality of symbols related to the frame before transmission from the M transmitting antennas, and the step of performing the second channel estimation operation on the signal field to obtain the plurality of second composite channel estimation values related to the signal field further comprises obtaining the plurality of second composite channel estimation values related to the signal field according to the plurality of symbols.

5. The channel estimation method according to claim 4, wherein the step of performing the third channel estimation operation on the data segment to obtain the plurality of first channel estimation values related to the data segment further comprises obtaining the plurality of first channel estimation values related to the data segment based on the plurality of symbols, wherein the plurality of symbols are distinguished according to different transmitting moments.

6. The channel estimation method according to claim 5, wherein when the multi-input multi-output wireless LAN system uses spatial streams, the step of obtaining the plurality of first channel estimation values related to the data segment based on the plurality of symbols further comprises determining whether to perform the third channel estimation operation on the data segment according to a determinant calculation result of the plurality of symbols.

7. The channel estimation method according to claim 6, wherein the third channel estimation operation on the data segment is performed when the determinant calculation results of the plurality of symbols at a first transmitting moment and the plurality of symbols at an L transmitting moment are not zero, wherein L is a positive integer greater than 1.

8. The channel estimation method according to claim 5, wherein in the step of obtaining the plurality of second channel estimation values according to the plurality of first composite channel estimation values and the plurality of second composite channel estimation values, further comprises steps of:

obtaining a plurality of weighted channel estimation values according to the plurality of first composite channel estimation values and the plurality of second composite channel estimation values; and obtaining the plurality of second channel estimation values based on the plurality of weighted channel estimation values and the plurality of first composite channel estimation values.

9. The channel estimation method according to claim 8, wherein when both M and N are 2, and the long training field and the signal field are the very high throughput long training field and the very high throughput signal field type B respectively, the plurality of weighted channel estimation values are $H_{R00}=(H_{R00,sigb}+H_{R00,ltf})/2$ and $H_{R10}=(H_{R10,sigb}H_{R10,ltf})/2$, wherein $H_{R00,ltf}$ is the first composite channel estimation value when a first one of the N receiving antennas receives a first signal related to the long training field, $H_{R10,ltf}$ is the first composite channel estimation value when a second one of the N receiving antennas receives the first signal related to the long training field, $H_{R00,sigb}$ is the second composite channel estimation value when the first one of the N receiving antennas receives a signal related to the signal field, and $H_{R10,sigb}$ is the second composite channel estimation value when the second one of the N receiving antennas receives the signal related to the signal field.

10. A channel estimation circuit, adapted for a receiving device of a multi-input multi-output wireless LAN system, wherein the receiving device has N receiving antennas, through the N receiving antennas the receiving device receives a frame transmitted from M transmitting antennas, and the frame comprises at least one long training field, a signal field and a data segment, wherein M and N are both positive integers greater than 1, and the channel estimation circuit comprises:

a long training field channel estimation circuit, performing a first channel estimation operation on the long training field to obtain a plurality of first composite channel estimation values related to the long training field;

a signal field channel estimation circuit, performing a second channel estimation operation on the signal field to obtain a plurality of second composite channel estimation values related to the signal field;

a data segment channel estimation circuit, performing a third channel estimation operation on the data segment to obtain a plurality of first channel estimation values related to the data segment; and a time domain filtering circuit, coupled to the long training field channel estimation circuit, the signal field channel estimation circuit, and the data segment channel estimation circuit, obtaining a plurality of second channel estimation values according to the plurality of first composite channel estimation values and the plurality of second composite channel estimation values, and adjusting the plurality of first channel estimation values related to the data segment according to the plurality of second channel estimation values.

11. The channel estimation circuit according to claim 10, wherein the long training field and the signal field are respectively a high throughput long training field and a high throughput signal field, or respectively a very high throughput long training field and a very high throughput signal field type B.

12. The channel estimation circuit according to claim 11, wherein in the first channel estimation operation, the long training field channel estimation circuit obtains the plurality of first composite channel estimation values related to the long training field based on the known long training field and a mapping matrix.

13. The channel estimation circuit according to claim 12, wherein the channel estimation circuit further comprises:
a symbol recovery operation circuit, performing a symbol recovery operation on the frame to obtain a plurality of symbols related to the frame before transmission from the M transmitting antennas, and in the second channel estimation operation, the signal field channel estimation circuit obtains the plurality of second composite channel estimation values related to the signal field according to the plurality of symbols.

14. The channel estimation circuit according to claim 13, wherein in the third channel estimation operation, the data segment channel estimation circuit obtains the plurality of first channel estimation values related to the data segment based on the plurality of symbols, wherein the plurality of symbols are distinguished according to different transmitting moments.

15. The channel estimation circuit according to claim 14, wherein when the multi-input multi-output wireless LAN system uses spatial streams, in the third channel estimation operation, the data segment channel estimation circuit further determines whether to perform the third channel estimation operation on the data segment according to a determinant calculation result of the plurality of symbols.

16. The channel estimation circuit according to claim 15, wherein the data segment channel estimation circuit performs the third channel estimation operation on the data segment when the determinant calculation results of the plurality of symbols at a first transmitting moment and the plurality of symbols at an L transmitting moment are not zero, wherein L is a positive integer greater than 1.

17. The channel estimation circuit according to claim 14, wherein the time domain filtering circuit performs following steps to obtain the plurality of second channel estimation values according to the plurality of first composite channel estimation values and the plurality of second composite channel estimation values:
obtaining a plurality of weighted channel estimation values according to the plurality of first composite channel estimation values and the plurality of second composite channel estimation values; and
obtaining the plurality of second channel estimation values based on the plurality of weighted channel estimation values and the plurality of first composite channel estimation values.

18. The channel estimation circuit according to claim 17, wherein when both M and N are 2, and the long training field and the signal field are the very high throughput long training field and the very high throughput signal field type B respectively, the plurality of weighted channel estimation values are $H_{R00}=(H_{R00,sigb}+H_{R00,ltf})/2$ and $H_{R10}=(H_{R10,sigb}+H_{R10,ltf})/2$, wherein $H_{R00,ltf}$ is the first composite channel estimation value when a first one of the N receiving antennas receives a first signal related to the long training field, $H_{R10,ltf}$ is the first composite channel estimation value when a second one of the N receiving antennas receives the first signal related to the long training field, $H_{R00,sigb}$ is the second composite channel estimation value when the first one of the N receiving antennas receives a signal related to the signal field, and $H_{R10,sigb}$ is the second composite channel estimation value when the second one of the N receiving antennas receives the signal related to the signal field.

* * * * *